United States Patent
Tanaka

(10) Patent No.: US 11,637,576 B2
(45) Date of Patent: Apr. 25, 2023

(54) RADIO-FREQUENCY MODULE AND COMMUNICATION DEVICE

(71) Applicant: Murata Manufacturing Co., Ltd., Kyoto (JP)

(72) Inventor: Rui Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 65 days.

(21) Appl. No.: 17/473,105

(22) Filed: Sep. 13, 2021

(65) Prior Publication Data

US 2021/0409051 A1 Dec. 30, 2021

Related U.S. Application Data

(63) Continuation of application No. PCT/JP2020/023116, filed on Jun. 11, 2020.

(30) Foreign Application Priority Data

Jun. 25, 2019 (JP) .............................. JP2019-117602

(51) Int. Cl.
*H04B 1/16* (2006.01)
*H04B 1/00* (2006.01)
*H04B 1/12* (2006.01)

(52) U.S. Cl.
CPC ............... *H04B 1/16* (2013.01); *H04B 1/005* (2013.01); *H04B 1/12* (2013.01)

(58) Field of Classification Search
CPC ............. H04B 1/16; H04B 1/005; H04B 1/12
See application file for complete search history.

(56) References Cited

U.S. PATENT DOCUMENTS

2004/0238954 A1 12/2004 Miyaji et al.
2007/0182510 A1* 8/2007 Park .......................... H03H 3/04
333/189

(Continued)

FOREIGN PATENT DOCUMENTS

| JP | 2003-218150 A | 7/2003 |
| JP | 2007-214566 A | 8/2007 |
| WO | 2016/189952 A1 | 12/2016 |

OTHER PUBLICATIONS

International Search Report for International Application No. PCT/JP2020/023116 dated Sep. 8, 2020.

*Primary Examiner* — Junpeng Chen
(74) *Attorney, Agent, or Firm* — Peame & Gordon LLP

(57) ABSTRACT

A radio-frequency module is able to simultaneously communicate a signal of a first communication band and a signal of a second communication band and does not simultaneously communicate a signal of the first communication band and a signal of a third communication band. The radio-frequency module includes a mounting substrate, a filter, a filter, and a filter. The filter is provided on the mounting substrate and has the first communication band as the pass band thereof. The filter is provided on the mounting substrate and has the second communication band as the pass band thereof. The filter is provided on the mounting substrate and has the third communication band as the pass band thereof. The filter and the filter are indirectly stacked on top of each other and the filter and the filter are not stacked on top of each other.

12 Claims, 8 Drawing Sheets

(56) References Cited

U.S. PATENT DOCUMENTS

| | | |
|---|---|---|
| 2017/0012603 A1* | 1/2017 | Reisner .............. H01L 25/0657 |
| 2018/0026603 A1 | 1/2018 | Iwamoto |
| 2018/0076834 A1* | 3/2018 | Wloczysiak ......... H04M 11/062 |
| 2018/0261566 A1* | 9/2018 | Babcock ................. H01L 23/66 |
| 2019/0097672 A1* | 3/2019 | Nosaka ................ H04B 1/0458 |
| 2020/0168970 A1* | 5/2020 | Brunette ............. H05K 9/0039 |

* cited by examiner

RADIO-FREQUENCY MODULE AND COMMUNICATION DEVICE

CROSS REFERENCE TO RELATED APPLICATIONS

This is a continuation of International Application No. PCT/JP2020/023116 filed on Jun. 11, 2020 which claims priority from Japanese Patent Application No. 2019-117602 filed on Jun. 25, 2019. The contents of these applications are incorporated herein by reference in their entireties.

BACKGROUND

Technical Field

The present disclosure generally relates to a radio-frequency module and a communication device and more specifically relates to a radio-frequency module and a communication device that perform simultaneous communication in a plurality of frequency bands.

In the related art, electronic components that can be made low profile are known (Patent Document 1). Patent Document 1 discloses an electronic component that includes a piezoelectric substrate, a functional electrode that is provided on the piezoelectric substrate and faces a hollow space, an element substrate that is positioned above the piezoelectric substrate, and another functional electrode that is positioned above the functional electrode and is provided on the element substrate.

Patent Document 1: International Publication No. 2016/189952

BRIEF SUMMARY

In recent years, electronic components (radio-frequency modules) that are small in size and can be applied to carrier aggregation have been desired. In order to realize such a radio-frequency module, it is necessary to prevent degradation of the isolation between filters used in simultaneous communication utilizing carrier aggregation.

The present disclosure provides a radio-frequency module and a communication device that can prevent degradation of isolation during carrier aggregation while achieving a reduction in size.

A radio-frequency module according to an aspect of the present disclosure is a radio-frequency module that is able to simultaneously communicate a signal of a first communication band and a signal of a second communication band that is at a different frequency from the first communication band, and that does not simultaneously communicate a signal of the first communication band and a signal of a third communication band that is at a different frequency from at least the second communication band among the first communication band and the second communication band. The radio-frequency module includes a mounting substrate, a first filter, a second filter, and a third filter. The first filter is provided on the mounting substrate and has the first communication band as the pass band thereof. The second filter is provided on the mounting substrate and has the second communication band as the pass band thereof. The third filter is provided on the mounting substrate and has the third communication band as the pass band thereof. The first filter and the third filter are stacked on top of each other and the first filter and the second filter are not stacked on top of each other.

A radio-frequency module according to an aspect of the present disclosure is a radio-frequency module that is able to simultaneously communicate a signal of a first communication band and a signal of a second communication band that is at a different frequency from the first communication band, and that does not simultaneously communicate a signal of the first communication band and a signal of a third communication band that is at a different frequency from at least the second communication band among the first communication band and the second communication band. The radio-frequency module includes a mounting substrate, a first filter, a second filter, and a third filter. The first filter is provided on the mounting substrate and has the first communication band as the pass band thereof. The second filter is provided on the mounting substrate and has the second communication band as the pass band thereof. The third filter is provided on the mounting substrate and has the third communication band as the pass band thereof. The first filter and the second filter are stacked on top of each other. The third filter is stacked between the first filter and the second filter.

A communication device according to an aspect of the present disclosure includes the radio-frequency module and a signal processing circuit that performs signal processing on a signal that passes through the radio-frequency module.

According to the present disclosure, degradation of isolation during carrier aggregation can be prevented while realizing a reduction in size.

DETAILED DESCRIPTION

Figure 1:
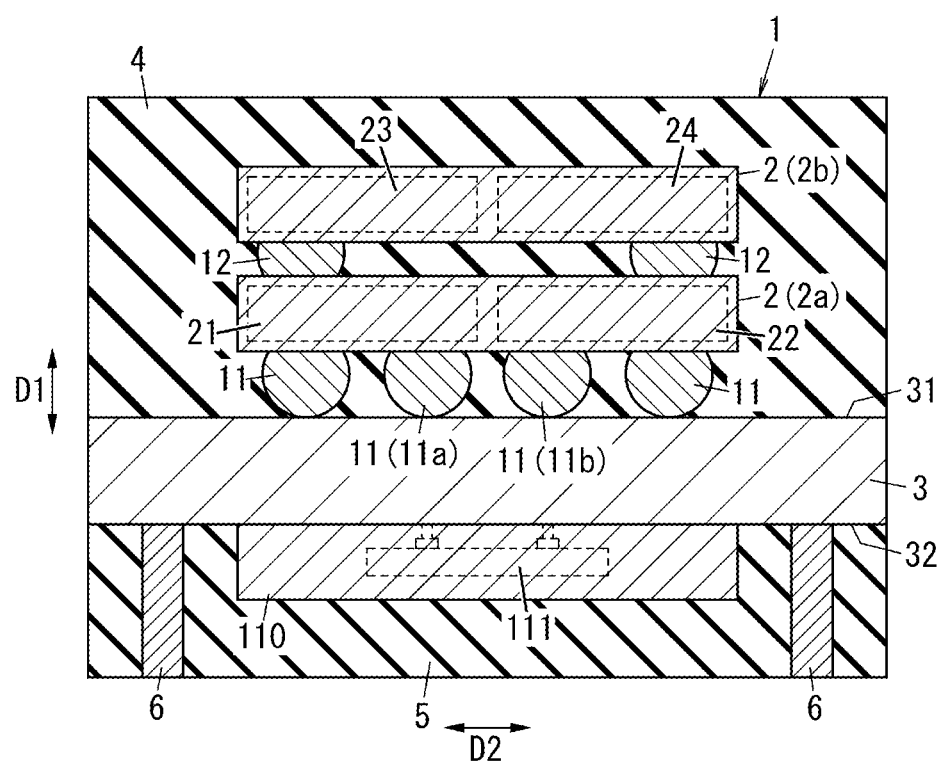
FIG. 1 is a schematic sectional view of a radio-frequency module according to an embodiment.

The FIGS. 1 to 10 referred to in the following embodiment and so forth are all schematic drawings and the ratios between the sizes, thicknesses, and so forth of the individual constituent elements in the drawings do not necessarily reflect the actual dimensional ratios.

(Embodiment)

Hereafter, a radio-frequency module 1 and a communication device 200 according to an embodiment will be described using FIGS. 1 to 10.

(1) Overall Configuration of Radio-Frequency Module

The radio-frequency module 1 according to the embodiment is, for example, used in the communication device 200 (refer to FIG. 8), which supports multiple modes and multiple bands. The communication device 200 is, for example, a mobile phone (for example, a smartphone), but is not limited to being a mobile phone and, for example, may instead be a wearable terminal (for example, a smart watch).

The radio-frequency module 1 is, for example, provided in the multi-band communication device 200 compliant with a communication standard such as long term evolution (LTE). The radio-frequency module 1 is configured to as to be able to support carrier aggregation in which signals of different communication bands are simultaneously communicated. In this embodiment, the radio-frequency module 1 performs simultaneous communication in a plurality of frequency bands. Specifically, the radio-frequency module 1 receives transmission waves generated by bundling together and then transmitting radio waves (carriers) of a plurality of frequency bands.

(2) Constituent Elements of Radio-Frequency Module

Next, the constituent elements of the radio-frequency module 1 of this embodiment will be described.

As illustrated in FIG. 1, the radio-frequency module 1 of this embodiment includes a mounting substrate 3 and a plurality of (two in the illustrated example) filter units 2. In this embodiment, when the plurality of filter units 2 are referred to individually, the filter units 2 are referred to as a filter unit 2a and a filter unit 2b.

Figure 8:
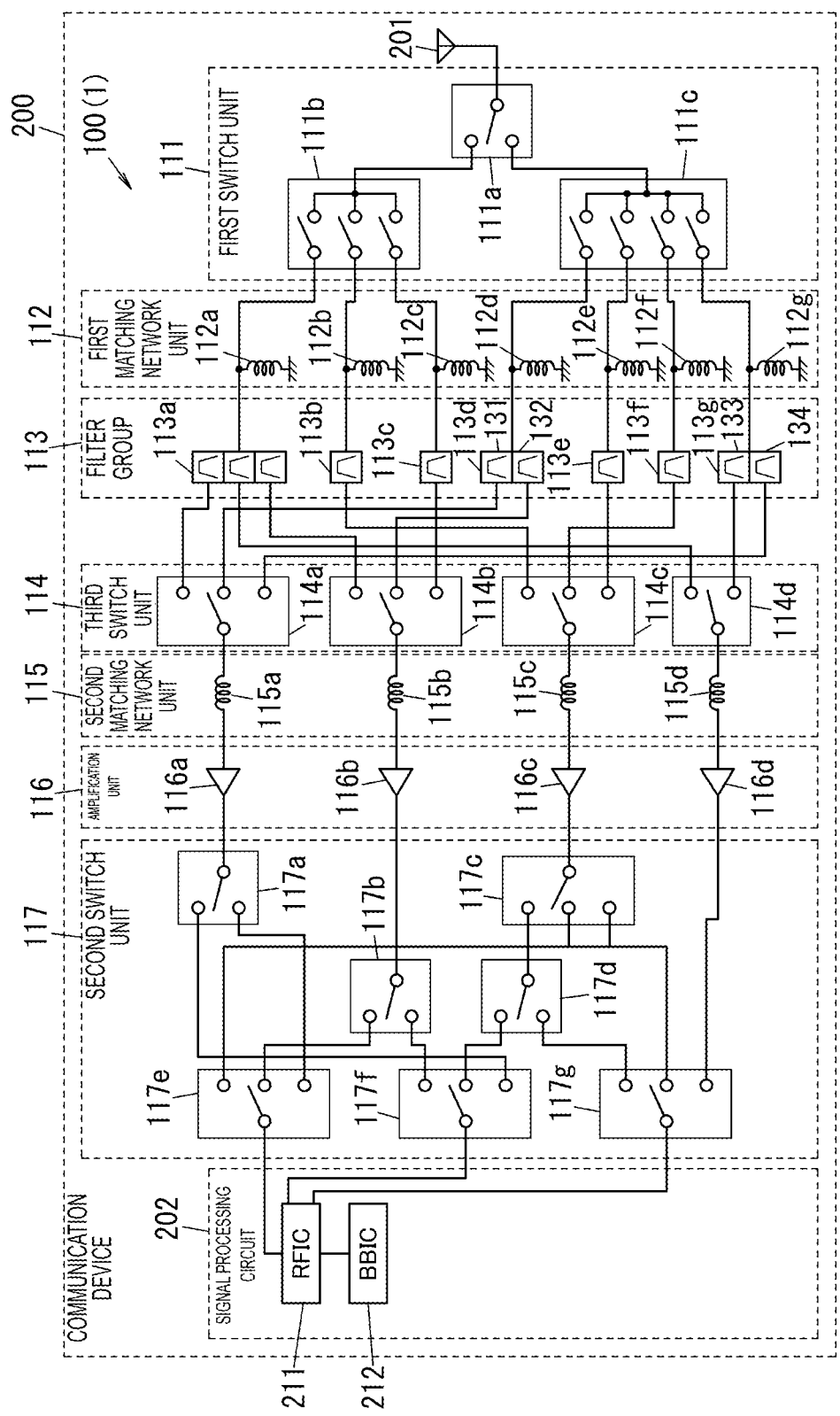
FIG. 8 is a diagram for describing the configuration of a front-end module, which is a radio-frequency module, of an application example.

The radio-frequency module 1 includes a filter group 113, which includes the filter units 2a and 2b, a first matching network unit 112, and a second matching network unit 115 (refer to FIG. 8). In addition, the radio-frequency module 1 includes a switch integrated circuit (IC) 110, which is a semiconductor element that includes a first switch unit 111, which is an antenna switch, a second switch unit 117, a third switch unit 114, and an amplification unit 116 (refer to FIGS. 8 and 9).

The mounting substrate 3 has a first main surface 31 and a second main surface 32, which face each other in a first direction D1, which is a thickness direction of the mounting substrate 3. Components such as the filter units 2 of the radio-frequency module 1 are provided on the first main surface 31 and the second main surface 32. For example, the filter group 113, the first matching network unit 112, and the second matching network unit 115 are provided on the first main surface 31. The switch IC 110 is provided on the second main surface 32.

The radio-frequency module 1 further includes, on the first main surface 31 of the mounting substrate 3, a first resin layer 4 that covers electronic components, such as the filter group 113, the first matching network unit 112, and the second matching network unit 115 mounted on the first main surface 31. The radio-frequency module 1 further includes, on the second main surface 32 of the mounting substrate 3, a second resin layer 5 that covers electronic components such as the switch IC 110 mounted on the second main surface 32. The material of the second resin layer 5 may be the same material as the first resin layer 4 or may be a different material.

Furthermore, the radio-frequency module 1 includes a plurality of external connection electrodes 6. The plurality of external connection electrodes 6 connect the radio-frequency module 1 to a mother substrate on which a signal processing circuit 202 and so forth, which will be described later, are mounted. The plurality of external connection electrodes 6 are columnar (for example, cylindrical) electrodes provided on the second main surface 32 of the mounting substrate 3. The material of the plurality of external connection electrodes 6 is, for example, a metal (for example, copper, a copper alloy, and so forth).

The filter unit 2a is connected to the first main surface 31 of the mounting substrate 3 via a plurality of terminals 11. The filter unit 2b is connected to the filter unit 2a via a plurality of terminals 12 and is connected to the mounting substrate 3 via the filter unit 2a. In other words, the filter units 2a and 2b are mounted on the first main surface 31 side of the mounting substrate 3. In this embodiment, the filter units 2a and 2b are disposed (stacked) in the order of the filter unit 2a and the filter unit 2b in the first direction D1 from the mounting substrate 3. In addition, the filter units 2a and 2b are disposed so as to overlap when the mounting substrate 3 is viewed in the first direction D1, i.e., when the mounting substrate 3 is viewed in plan view (refer to FIG. 1). Here, the plurality of terminals 11 and the plurality of terminals 12 are, for example, bumps. The bumps are solder bumps, for example. The bumps are not limited to being solder bumps and may instead be metal bumps, for example.

The filter units 2 are each formed of a plurality of filters. In other words, a plurality of filters are integrated into a single chip and form each filter unit 2. The plurality of filters are radio-frequency filters. For example, each filter unit 2 is formed of two filters. Specifically, the filter unit 2a is formed of formed of filters 21 and 22 and the filter unit 2b is formed of filters 23 and 24 (refer to FIG. 2A). In other words, the radio-frequency module 1 includes a plurality of filters (the filters 21 to 24 in the illustrated example). Since the filter units 2a and 2b are mounted on the first main surface 31 side of the mounting substrate 3, a plurality of filters (the filters 21 to 24) are disposed on the same side (first main surface 31 side) of the mounting substrate 3.

The plurality of filters allow reception signals of prescribed frequency bands, among reception signals received by an antenna 201 (refer to FIG. 8), to pass therethrough. In this embodiment, the filter 21 allows a reception signal of a frequency band corresponding to Band 1, as a communication band, to pass therethrough. The filter 22 allows a reception signal of a frequency band corresponding to Band 66, as a communication band, to pass therethrough. The filter 23 allows a reception signal of a frequency band corresponding to Band 25, as a communication band, to pass therethrough. The filter 24 allows a reception signal of a frequency band corresponding to Band 3, as a communication band, to pass therethrough. In other words, the filter 21 is a filter having a frequency band corresponding to Band 1 as the pass band thereof. The filter 22 is a filter having a frequency band corresponding to Band 66 as the pass band thereof. The filter 23 is a filter having a frequency band corresponding to Band 25 as the pass band thereof. The filter 24 is a filter having a frequency band corresponding to Band 3 as the pass band thereof.

The plurality of filters are, for example, acoustic wave filters and the plurality of series arm resonators and the plurality of parallel arm resonators thereof are formed of acoustic wave resonators. The acoustic wave filters are, for example, surface acoustic wave (SAW) filters that utilize surface acoustic waves. However, the plurality of filters do not have to be SAW filters. Rather than SAW filters, the plurality of filters may, for example, be bulk acoustic wave (BAW) filters.

Figure 2A:
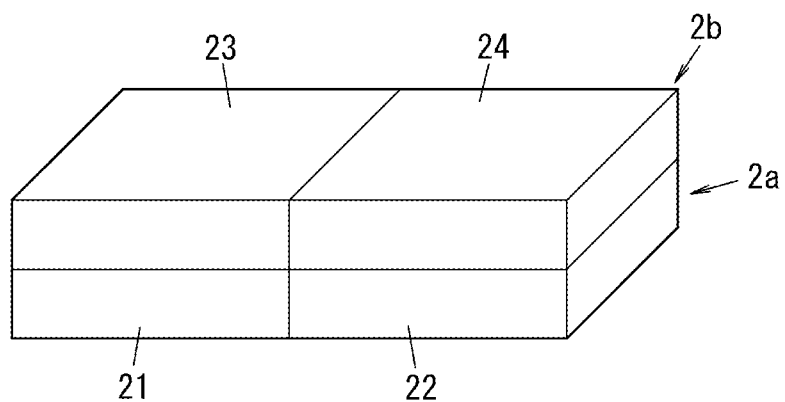
FIG. 2A is a schematic diagram for describing the configuration of two filter units of the radio-frequency module of the embodiment.
Figure 2B:
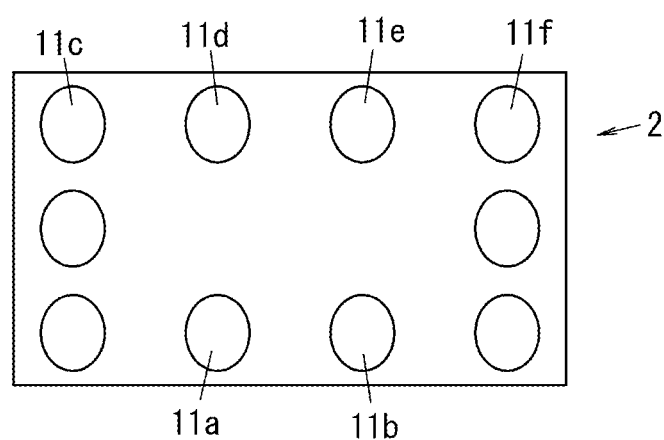
FIG. 2B is a diagram for describing the arrangement of terminals for inputting and outputting signals to and from the two filter units of the embodiment.

The filter 21 and the filter 23 are disposed so as to overlap when the mounting substrate 3 is viewed in the first direction D1, i.e., when the mounting substrate 3 is viewed in plan view (refer to FIG. 2A). In other words, the filter 21 and the filter 23 are stacked in the first direction D1. The filter 22 and the filter 24 are disposed so as to overlap when the mounting substrate 3 is viewed in the first direction D1, i.e., when the mounting substrate 3 is viewed in plan view (refer to FIG. 2A). In other words, the filter 22 and the filter 24 are stacked in the first direction D1.

In this embodiment, the filter 21 and the filter 23 are disposed in the order of the filter 21 and the filter 23 on the mounting substrate 3. The filter 22 and the filter 24 are disposed in the order of the filter 22 and the filter 24 on the mounting substrate 3.

Furthermore, the filter 24 is disposed so as to be aligned with the filter 23 in a second direction D2, which is perpendicular to the first direction D1, of the mounting substrate 3. Similarly, the filter 21 is disposed so as to be aligned with the filter 22 in the second direction D2.

Band 1 and Band 3 can be simultaneously utilized when performing reception of signals using carrier aggregation. Band 66 and Band 25 can be simultaneously utilized when performing reception of signals using carrier aggregation.

Therefore, in the radio-frequency module 1, the filter 21 and the filter 23, which is not used together with the filter 21 when performing simultaneous communication, are disposed so as to be aligned in the first direction D1. Similarly, the filter 22 and the filter 24, which is not used together with the filter 22 when performing simultaneous communication, are disposed so as to be aligned in the first direction D1.

Furthermore, the filter 24 and the filter 23 are disposed so as to be aligned and the filter 21 and the filter 22 are disposed so as to be aligned in the second direction D2. Therefore, the filter 21 corresponding to Band 1 and the filter 24 corresponding to Band 3 are disposed along a direction (diagonal direction) between the first direction D1 and the second direction D2 and the filter 22 corresponding to Band 66 and the filter 23 corresponding to Band 25 are disposed in a direction (diagonal direction) between the first direction D1 and the second direction D2.

The switch IC 110 is provided on the second main surface 32 of the mounting substrate 3. When the mounting substrate 3 is viewed in the first direction D1, i.e., when the mounting substrate 3 is viewed in plan view, the switch IC 110 overlaps the filter units 2 (2a, 2b) (refer to FIG. 1). Specifically, when the mounting substrate 3 is viewed in plan view, the switch IC 110 overlaps at least part of the filter 21 and the filter 23. In more detail, when the mounting substrate 3 is viewed in plan view, the first switch unit 111 (antenna switch), which is included in the switch IC 110, overlaps at least part of the filter 21 and the filter 23. Similarly, when the mounting substrate 3 is viewed in plan view, the first switch unit 111 (antenna switch) overlaps at least part of the filter 22 and the filter 24.

When carrier aggregation is used, signals of a plurality of frequency bands are bundled together. A signal containing a plurality of frequencies is input to a filter and a reception signal of a prescribed frequency band can be transmitted through the filter.

For example, when carrier aggregation is utilized in which frequency bands corresponding to Band 1 and Band 3 are used, a signal received by the communication device 200 including the radio-frequency module 1 is input to the filters 21 and 24, and as a result, a signal of the frequency band corresponding to Band 1 is obtained from the filter 21 and a signal of the frequency band corresponding to Band 3 is obtained from the filter 24. Similarly, when carrier aggregation is utilized in which frequency bands corresponding to Band 66 and Band 25 are used, a signal received by the communication device 200 including the radio-frequency module 1 is input to the filters 22 and 23, and as a result, a signal of the frequency band corresponding to Band 66 is obtained from the filter 22 and a signal of the frequency band corresponding to Band 25 is obtained from the filter 23.

In other words, in this embodiment, it is suitable to provide a first input terminal that is for inputting a signal to the filters 21 and 24 and a second input terminal that is for inputting a signal to the filters 21 and 24. The path between the first input terminal and the respective input terminals of the filters 21 and 24 can be short. Similarly, the path between the second input terminal and the respective input terminals of filters 22 and 23 can be short.

Accordingly, in this embodiment, a terminal 11a (refer to FIG. 1 and FIGS. 2B and 2C), out of the plurality of terminals 11, is used as the first input terminal and is connected to the input terminals of the filter 21 and the filter 24. A terminal 11b (refer to FIG. 1 and FIGS. 2B and 2C), out of the plurality of terminals 11, is used as the second input terminal and is connected to the input terminals of the filter 22 and the filter 23.

The terminals 11a and 11b are connected to the first switch unit 111. When carrier aggregation is utilized in which frequency bands corresponding to Band 1 and Band 3 are used, a signal received by the communication device 200 including the radio-frequency module 1 is input to the filters 21 and 24 via the terminal 11a from the first switch unit 111. When carrier aggregation is utilized in which frequency bands corresponding to Band 66 and Band 25 are used, a signal received by the communication device 200 including the radio-frequency module 1 is input to the filters 22 and 23 via the terminal 11b from the first switch unit 111.

In addition, when carrier aggregation is utilized in which frequency bands corresponding to Band 1 and Band 3 are used, it is suitable to provide a first output terminal that is for outputting a signal of a frequency band corresponding to Band 1 that has passed through the filter 21 and a second output terminal that is for outputting a signal of a frequency band corresponding to Band 3 that has passed through the filter 24. Here, the path between the first output terminal and the output terminal of the filter 21 can be short. The path between the second output terminal and the output terminal of the filter 24 can be short.

Similarly, when carrier aggregation is utilized in which frequency bands corresponding to Band 66 and Band 25 are used, it is suitable to provide a third output terminal that is for outputting a signal of a frequency band corresponding to Band 66 that has passed through the filter 22 and a fourth output terminal that is for outputting a signal of a frequency band corresponding to Band 25 that has passed through the filter 23. Here, the path between the third output terminal and the output terminal of the filter 22 can be short. The path between the fourth output terminal and the output terminal of the filter 23 can be short.

Consequently, in this embodiment, a terminal 11c (refer to FIG. 2C), out of the plurality of terminals 11, is used as the first output terminal and is connected to the output terminal of the filter 21. A terminal 11d (refer to FIG. 2C), out of the plurality of terminals 11, is used as the fourth output terminal and is connected to the output terminal of the filter 23. A terminal 11e (refer to FIG. 2C), out of the plurality of terminals 11, is used as the second output terminal and is connected to the output terminal of the filter 24. A terminal 11f (refer to FIG. 2C), out of the plurality of terminals 11, is used as the third output terminal and is connected to the output terminal of the filter 23.

Figure 2C:
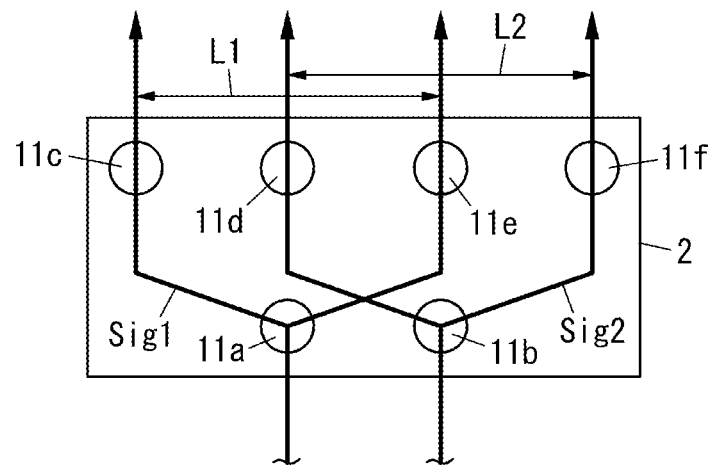
FIG. 2C is a diagram for describing the flow of signals in the two filter units of the embodiment.

As illustrated in FIG. 2C, a signal Sig1 input to the terminal 11a is output from the terminals 11c and 11e. At this time, a signal Sig1 output from the terminal 11c is a signal of a frequency band corresponding to Band 1 and a signal Sig1 output from the terminal 11e is a signal of a frequency band corresponding to Band 3. In addition, a signal Sig2 input to the terminal 11b is output from the terminals 11d and 11f. At this time, a signal Sig2 output from the terminal 11d is a signal of a frequency band corresponding to Band 25 and a signal Sig2 output from the terminal 11f is a signal of a frequency band corresponding to Band 66.

The positional arrangement of the filter unit 2a and the filter unit 2b may be reversed. In other words, the filter 21 and the filter 23 may be disposed in the order of the filter 23 and the filter 21 with respect to the mounting substrate 3 and the filter 22 and the filter 24 may be disposed in the order of the filter 24 and the filter 22 with respect to the mounting substrate 3.

In addition, in this embodiment, the filter 21 and the filter 22 are configured as a single chip and the filter 23 and the filter 24 are configured as a single chip but the filters are not limited to this configuration. Each of the filters 21 to 24 may be formed as a single chip.

In this embodiment, two filter units 2a and 2b are stacked on top of each other, but the present disclosure is not limited to this configuration. In short, three or more filters may be stacked on top of each other. In the case where three or more filters are stacked on top of each other, two filters that are not used during simultaneous communication, for example, the filter 21 and the filter 23 described above are directly or indirectly stacked on top of each other. Here, "directly stacked" means that there are no other filters disposed between the two stacked filters.

At this time, a filter that is used in simultaneous communication with the filter 21 and a filter that is used in simultaneous communication with the filter 23 are not stacked in the stack in which the filter 21 and the filter 23 are stacked.

Figure 3:
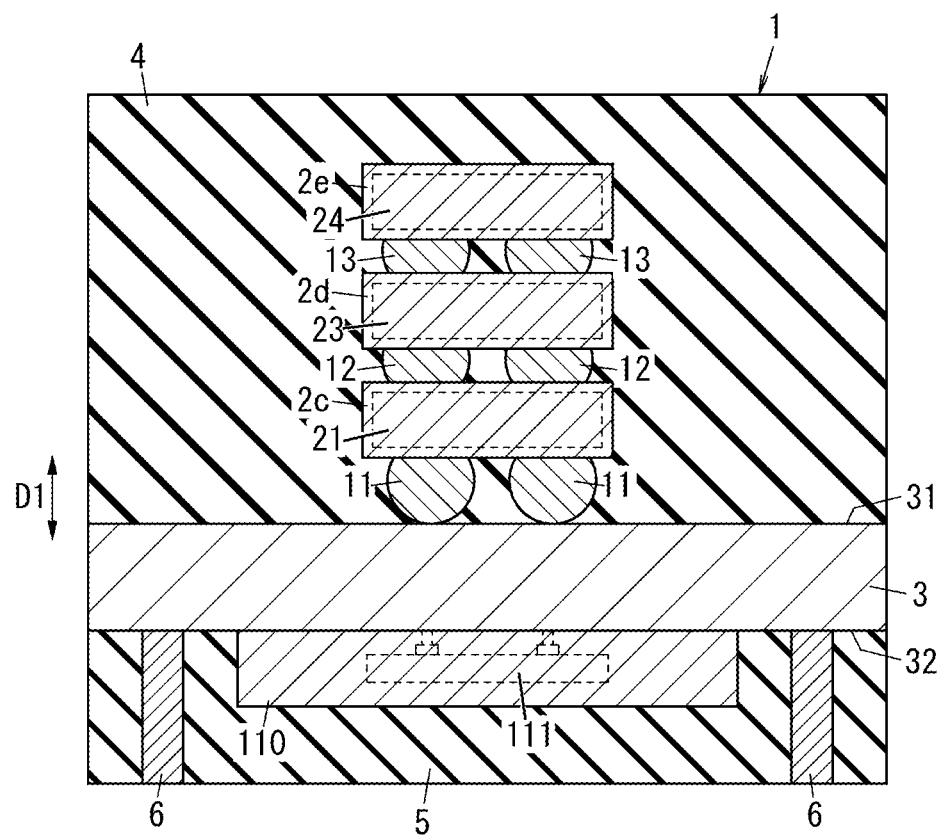
FIG. 3 is a diagram for describing an example of a case in which three filters are stacked in the radio-frequency module of the embodiment.

Furthermore, a filter that is used in simultaneous communication with the filter 21 and is not used in simultaneous communication with the filter 23 is stacked so that the filter 23 is disposed between that filter and the filter 21. For example, as illustrated in FIG. 3, the radio-frequency module 1 may have a configuration in which the filter 21, the filter 23, and the filter 24 described above are stacked. In this case, the filter 24 is a filter that is used in simultaneous communication with the filter 21 and is not used in simultaneous communication with the filter 23. In the radio-frequency module 1 in this case, a filter unit 2c including the filter 21, a filter unit 2d including the filter 23, and a filter unit 2e including the filter 24 are stacked on top of each other. The filter unit 2c is connected to the first main surface 31 of the mounting substrate 3 via a plurality of terminals 11. The filter unit 2d is connected to the filter unit 2c via a plurality of terminals 12 and is connected to the mounting substrate 3 via the filter unit 2c. The filter unit 2e is connected to the filter unit 2d via a plurality of terminals 13 and is connected to the mounting substrate 3 via the filter units 2c and 2d. In other words, the filter units 2c, 2d, and 2e are mounted on the first main surface 31 side of the mounting substrate 3. In this embodiment, the filter units are disposed (stacked) in the order of the filter unit 2c, the filter unit 2d, and the filter unit 2e in the first direction D1 from the mounting substrate 3. In other words, the filter 23, which is not used in simultaneous communication with the filter 21, is stacked between the filter 21 and the filter 24, which are used together in simultaneous communication (refer to FIG. 3). In other words, the filters are stacked in the order of the filter 21, the filter 23, and the filter 24 in the first direction D1 (thickness direction) from the (first main surface 31 of) the mounting substrate 3. In other words, the filter 21 and the filter 24 are stacked on top of each other and the filter 23 is stacked between the filter 21 and the filter 24.

In addition, the filter units 2c, 2d, and 2e are disposed so as to overlap when the mounting substrate 3 is viewed in the first direction D1, i.e., when the mounting substrate 3 is viewed in plan view (refer to FIG. 1). In addition, when the mounting substrate 3 is viewed in plan view, the first switch unit 111 (antenna switch) included in the switch IC 110 overlaps at least part of the filter 21, the filter 23, and the filter 24. Here, the plurality of terminals 11, the plurality of terminals 12, and the plurality of terminals 13 are bumps, for example. The bumps are solder bumps, for example. The bumps are not limited to being solder bumps and may instead be metal bumps, for example.

Alternatively, a filter that is used in simultaneous communication with the filter 21 and is not used in simultaneous communication with the filter 23 may be disposed so to not overlap the stack in which the filters 21 and 23 are stacked when the mounting substrate 3 is viewed in plan view.

(3) Effects

In this embodiment, the filter 21 and the filter 23, which is not used together with the filter 21 when performing simultaneous communication, are disposed (stacked) so as to be aligned in the first direction D1 and the filter 22 and the filter 24, which is not used together with the filter 22 when performing simultaneous communication, are disposed so as to be aligned in the first direction D1. In addition, in this embodiment, the filter 24 and the filter 23 are disposed so as to be aligned in the second direction D2 and the filter 21 and the filter 22 are disposed so as to be aligned in the second direction D2. The area of the mounting substrate 3 can be reduced as a result of the filter 21 and the filter 23 being stacked in the first direction D1 and the filter 22 and the filter 24 being stacked in the first direction D1. As a result, the radio-frequency module 1 can be reduced in size.

Figure 4A:
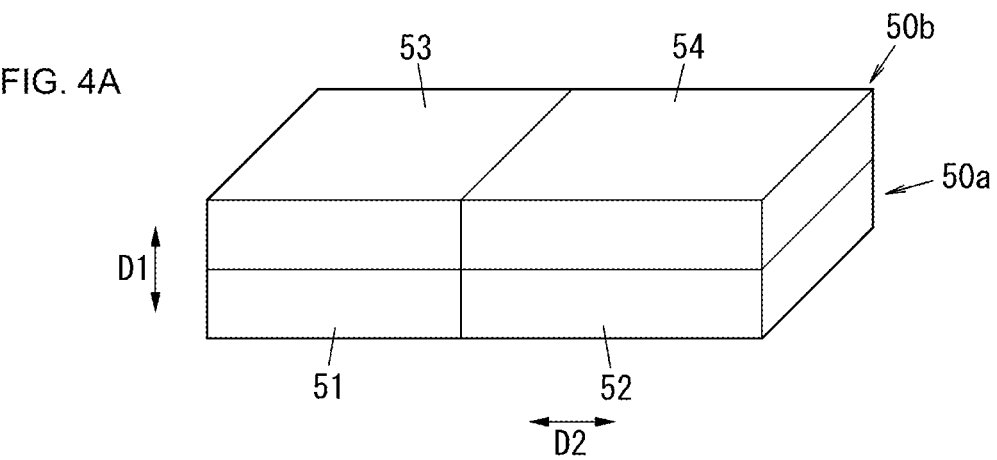
FIG. 4A is a schematic diagram for describing the configurations of two filter units in a comparative example.

On the other hand, a configuration in which two filters that are used together when performing simultaneous communication are disposed (stacked) so as to be aligned in the first direction D1 and two filters that are not used together when performing simultaneous communication are disposed so as to be aligned in the second direction may be considered. For example, as illustrated in FIG. 4A, a case is assumed in which a filter unit 50a and a filter unit 50b are aligned in the first direction D1. The filter unit 50a includes a filter 51 that allows a signal of a frequency band corresponding to Band 1 to pass therethrough and a filter 52 that allows a signal of a frequency band corresponding to Band 66 to pass therethrough. The filter unit 50b includes a filter 53 that allows a signal of a frequency band corresponding to Band 3 to pass therethrough and a filter 54 that allows a signal of a frequency band corresponding to Band 25 to pass therethrough.

Here, the filter 51 and the filter 53, which is not used together with the filter 51 when performing simultaneous communication, are disposed (stacked) so as to be aligned in the first direction D1. In addition, the filter 52 and the filter 54, which is not used together with the filter 52 when performing simultaneous communication, are disposed (stacked) so as to be aligned in the first direction D1. In this case as well, since the filter 21 and the filter 23 are stacked in the first direction D1 and the filter 22 and the filter 24 are stacked in the first direction D1, the radio-frequency module 1 can be reduced in size.

The filter unit 50a is connected to a mounting substrate 60 via a plurality of first connection terminals (bumps). The filter unit 50b is connected to the filter unit 50a via a plurality of second connection terminals (bumps) and is connected to the mounting substrate 60 via the filter unit 50a.

Figure 4B:
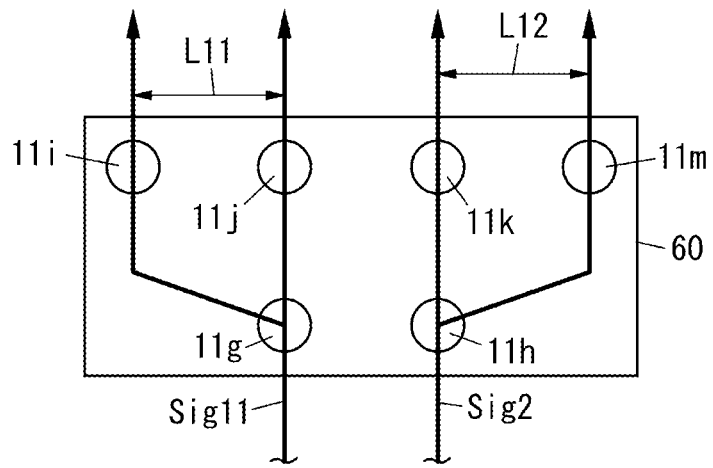
FIG. 4B is a diagram for describing the flow of signals in the two filter units in the comparative example.

The plurality of first connection terminals includes a terminal 11g that is for inputting a signal to the filter 51 and the filter 53 and a terminal 11h that is for inputting a signal to the filter 52 and the filter 54 (refer to FIG. 4B).

The plurality of first connection terminals includes a fifth output terminal that is for outputting a signal of a frequency band corresponding to Band 1 that has passed through the filter 51 and a sixth output terminal that is for outputting a signal of a frequency band corresponding to Band 3 that has passed through the filter 53. In addition, the plurality of first connection terminals includes a seventh output terminal that is for outputting a signal of a frequency band corresponding to Band 66 that has passed through the filter 52 and an eighth output terminal that is for outputting a signal of a frequency band corresponding to Band 25 that has passed through the filter 54. In this case as well, the path between the fifth output terminal and the output terminal of the filter 51 can be short. The path between the sixth output terminal and the output terminal of the filter 53 can be short. The path between the seventh output terminal and the output terminal of the filter 52 can be short. The path between the eighth output terminal and the output terminal of the filter 54 can be short.

Accordingly, among the plurality of first connection terminals, a terminal 11i is used as the fifth output terminal and is connected to the output terminal of the filter 51 and a terminal 11j is used as the sixth output terminal and is connected to the output terminal of the filter 53. In addition, among the plurality of first connection terminals, a terminal 11k is used as the seventh output terminal and is connected to the output terminal of the filter 54 and a terminal 11m is used as the eighth output terminal and is connected to the output terminal of the filter 52.

As illustrated in FIG. 4B, a signal Sig11 input to the terminal 11g is output from the terminals 11i and 11j. At this time, a signal Sig11 output from the terminal 11i is a signal of a frequency band corresponding to Band 1 and a signal Sig11 output from the terminal 11j is a signal of a frequency band corresponding to Band 3. In addition, a signal Sig12 input to the terminal 11h is output from the terminals 11k and 11m. At this time, a signal Sig12 output from the terminal 11k is a signal of a frequency band corresponding to Band 25 and a signal Sig12 output from the terminal 11m is a signal of a frequency band corresponding to Band 66.

In the case where filters are stacked on top of each other, when filters that are used in simultaneous communication are stacked on top of each other, the distance between the terminal 11i (fifth output terminal) and the terminal 11j (sixth output terminal) illustrated in FIG. 4B is short and therefore isolation during carrier aggregation is degraded.

Accordingly, the radio-frequency module 1 of this embodiment is able to simultaneously communicate a signal of a first communication band (for example, Band 1) and a signal of a second communication band (for example, Band 3) that is at a different frequency from the first communication band, and does not simultaneously communicate a signal of the first communication band and a signal of a third communication band (for example, Band 25) that is at a different frequency from at least the second communication band among the first communication band and the second communication band. The radio-frequency module 1 includes a first filter (for example, the filter 21), a second filter (for example, the filter 24), and a third filter (for example, the filter 23). The first filter is provided on the mounting substrate 3 and has the first communication band as the pass band thereof. The second filter is provided on the mounting substrate 3 and has the second communication band as the pass band thereof. The third filter is provided on the mounting substrate 3 and has the third communication band as the pass band thereof. The first filter and the third filter are stacked on top of each other and the first filter and the second filter are not stacked on top of each other.

With this configuration, the first filter and the third filter, which are not used in simultaneous communication, are stacked on top of each other, and therefore degradation of isolation during carrier aggregation can be prevented while realizing a reduction in size compared with the case where filters that are used in simultaneous communication are stacked on top of each other.

In addition, in the case where simultaneous communication is performed using the second communication band and the third communication band, the second filter can be not stacked in the stack in which the first filter and the third filter are stacked. With this configuration, degradation of isolation during carrier aggregation in which the second communication band and the third communication band are used can be prevented.

Furthermore, in the case where simultaneous communication is not performed using the second communication band and the third communication band, the second filter can not overlap the stack consisting of the first filter and the third filter when the mounting substrate 3 is viewed in plan view. With this configuration, degradation of isolation during carrier aggregation can be prevented. The mounting area of the mounting substrate 3 can be reduced as a result of the second filter being stacked so that the third filter is disposed between the second filter and the first filter, and therefore the radio-frequency module 1 can be reduced in size.

Accordingly, the radio-frequency module 1 of this embodiment is able to simultaneously communicate a signal of a first communication band (for example, Band 1) and a signal of a second communication band (for example, Band 3) that is at a different frequency from the first communication band, and does not simultaneously communicate a signal of the first communication band and a signal of a third communication band (for example, Band 25) that is at a different frequency from at least the second communication band among the first communication band and the second communication band. The radio-frequency module 1 includes a first filter (for example, the filter 21), a second filter (for example, the filter 24), and a third filter (for example, the filter 23). The first filter is provided on the mounting substrate 3 and has the first communication band as the pass band thereof. The second filter is provided on the mounting substrate 3 and has the second communication band as the pass band thereof. The third filter is provided on the mounting substrate 3 and has the third communication band as the pass band thereof. The first filter and the second filter are stacked on top of each other. The third filter is stacked between the first filter and the second filter.

In this configuration, the third filter, which is not used with the first filter when performing simultaneous communication, is stacked between the first filter and the second filter, which is used together with the first filter when performing simultaneous communication. Therefore, degradation of isolation can be prevented compared with the case where the first filter and the second filter are directly stacked on top of each other. Furthermore, a reduction in size can be achieved by stacking the first filter, the second filter, and the third filter on top of each other.

In this embodiment, when the mounting substrate 3 is viewed in plan view, the first switch unit 111 (antenna switch) overlaps at least part of the first filter and the third filter described above. With this configuration, the paths between the first switch unit ill and the first filter and the third filter can be made short.

In addition, in this embodiment, the first filter (for example, the filter 21) and the second filter (for example, the filter 24) that are used in simultaneous communication are disposed so as to be aligned in a direction (diagonal direction) between the first direction D1 and the second direction D2. In other words, the second filter is disposed so as to be aligned with the third filter in the second direction D2. Therefore, for example, a distance L1 between the terminal 11c (first output terminal) and the terminal 11e (third output terminal) illustrated in FIG. 2C is longer than a distance L11 between the terminal 11i (fifth output terminal) and the terminal 11j (sixth output terminal) illustrated in FIG. 4B. As a result, the filter 21 and the filter 24, which are used in simultaneous communication, are disposed so as to be aligned in a direction (diagonal direction) between the first direction D1 and the second direction D2, and consequently, degradation of isolation can be better prevented compared with the case where filters that are used in simultaneous communication are disposed so as to be aligned in the first direction D1.

In a case where filters that are not used in simultaneous communication are disposed in the first direction D1, the second direction D2, and diagonal directions, a filter that is used in simultaneous communication is disposed in another region on the mounting substrate 3. For example, in the case where simultaneous communication is performed in which the first filter is used, the other filter is disposed in another region. Therefore, in this embodiment, the first filter (for example, the filter 21) and the second filter (for example, the filter 24) that are used in simultaneous communication are disposed so as to be aligned in a direction (diagonal direction) between the first direction D1 and the second direction D2. With this configuration, the path length of a signal can be shortened compared with a case where filters that are not used in simultaneous communication are disposed in the first direction D1, the second direction D2, and a diagonal direction.

(4) Modifications

Modifications are listed hereafter. The modifications described below can be applied by being appropriately combined with the above embodiment.

(4.1) Modification 1

A combination of two filters disposed so as to be aligned in the first direction D1 described in the embodiment is one example. The two filters can be disposed so as to be aligned in the first direction D1 be a combination of filters that are not used together when carrier aggregation is used, i.e., during simultaneous communication. The combination of the two filters disposed so as to be aligned in the first direction D1 can be any pair out of Band 1 and Band 34, Band 1 and Band 39, Band 3 and Band 30, Band 3 and Band 34, Band 3 and Band 39, Band 7 and Band 34, Band 7 and Band 39, Band 25 and Band 34, Band 25 and Band 39, Band 25 and Band 404, Band 30 and Band 34, Band 30 and Band 39, Band 34 and Band 40, Band 34 and Band 66, Band 39 and Band 66, Band 39 and Band 40, or any of pair of identical bands.

For example, the filter 21 may be a filter that allows a signal of a frequency band corresponding to Band 34 to pass therethrough and the filter 23 may be a filter that allows a signal of a frequency band corresponding to Band 34 to pass therethrough. The filter 22 may be a filter that allows a signal of a frequency band corresponding to Band 1 to pass therethrough and the filter 24 may be a filter that allows a signal of a frequency band corresponding to Band 39 to pass therethrough.

Alternatively, the filter 21 may be a filter that allows a signal of a frequency band corresponding to Band 30 to pass therethrough and the filter 23 may be a filter that allows a signal of a frequency band corresponding to Band 3 to pass therethrough. The filter 22 may be a filter that allows a signal of a frequency band corresponding to Band 40 to pass therethrough and the filter 24 may be a filter that allows a signal of a frequency band corresponding to Band 25 to pass therethrough.

(4.2) Modification 2

Figure 5:
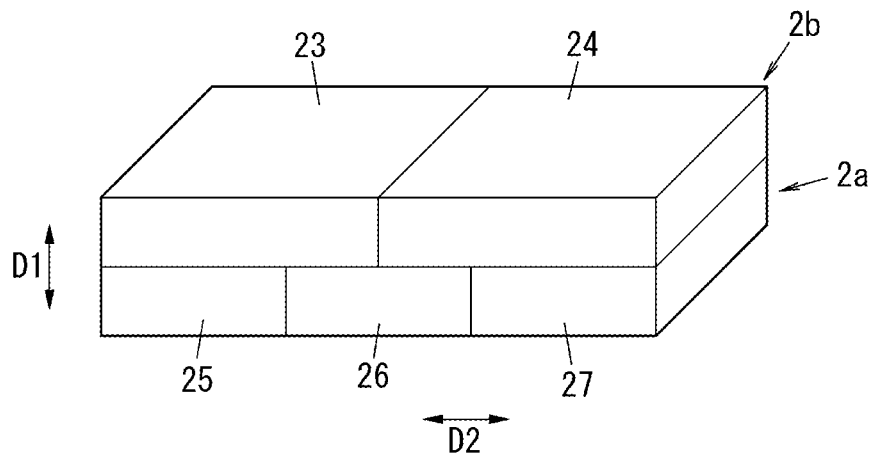
FIG. 5 is a schematic diagram for describing the configurations of two filter units in Modification 2.

In the above embodiment, as illustrated in FIG. 5, the filter unit 2a may include three filters 25 to 27 aligned in the second direction D2.

In this case, the filter 25 and the filter 23 are not used together during simultaneous communication. The filter 27 and the filter 24 are not used together during simultaneous communication. The filter 25 and the filter 24 are used together during simultaneous communication. The filter 27 and the filter 23 are used together during simultaneous communication. In addition, the filter 26 and the filter 23 are used together during simultaneous communication and the filter 26 and the filter 24 are used together during simultaneous communication.

For example, the filter 25 is a filter that allows a signal of a frequency band corresponding to Band 30 to pass therethrough and the filter 23 is a filter that allows a signal of a frequency band corresponding to Band 1 to pass therethrough. The filter 27 is a filter that allows a signal of a frequency band corresponding to Band 40 to pass therethrough and the filter 24 is a filter that allows a signal of a frequency band corresponding to Band 66 to pass therethrough. The filter 26 is a filter that allows a signal of a frequency band corresponding to Band 7 to pass therethrough.

Alternatively, the filter 25 is a filter that allows a signal of a frequency band corresponding to Band 30 to pass therethrough and the filter 23 is a filter that allows a signal of a frequency band corresponding to Band 3 to pass therethrough. The filter 27 is a filter that allows a signal of a frequency band corresponding to Band 40 to pass therethrough and the filter 24 is a filter that allows a signal of a frequency band corresponding to Band 25 to pass therethrough. The filter 26 is a filter that allows a signal of a frequency band corresponding to Band 7 to pass therethrough.

(4.3) Modification 3

In the above embodiment, two filters that are used in simultaneous communication are disposed in a diagonal direction, but the present disclosure is not limited to this configuration.

Two filters that are not used together in simultaneous communication may also be disposed in a diagonal direction.

For example, the filter 21 may be a filter that allows a signal of a frequency band corresponding to Band 3 to pass therethrough and the filter 23 may be a filter that allows a signal of a frequency band corresponding to Band 34 to pass therethrough. The filter 22 may be a filter that allows a signal of a frequency band corresponding to Band 25 to pass therethrough and the filter 24 may be a filter that allows a signal of a frequency band corresponding to Band 39 to pass therethrough.

Alternatively, the filter 21 may be a filter that allows a signal of a frequency band corresponding to Band 1 to pass therethrough and the filter 23 may be a filter that allows a signal of a frequency band corresponding to Band 34 to pass therethrough. The filter 22 may be a filter that allows a signal of a frequency band corresponding to Band 66 to pass therethrough and the filter 24 may be a filter that allows a signal of a frequency band corresponding to Band 39 to pass therethrough.

Figure 6A:
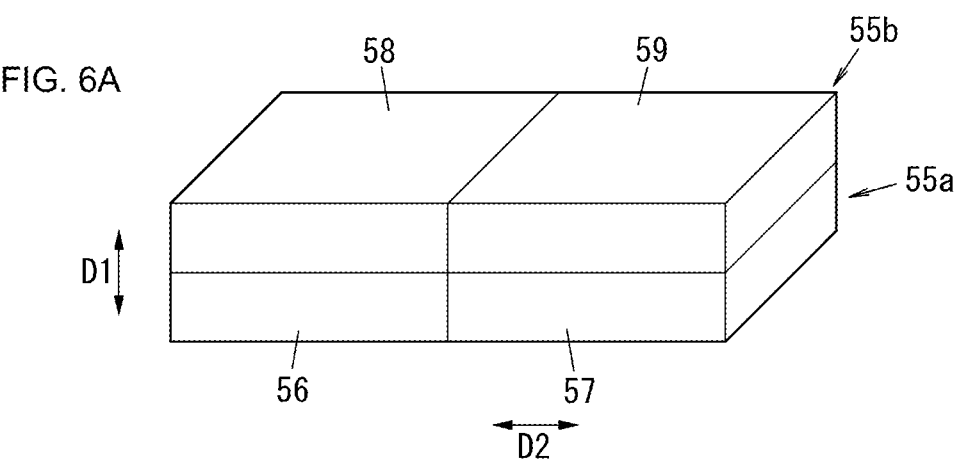
FIG. 6A is a schematic diagram for describing the configurations of two filter units in Modification 3.

For example, as illustrated in FIG. 6A, a filter unit 55a includes a filter 56 that allows a signal of a frequency band corresponding to Band 3 to pass therethrough and a filter 57 that allows a signal of a frequency band corresponding to Band 25 to pass therethrough. The filter 56 and the filter 57 are disposed so as to be aligned in the second direction. A filter unit 55b includes a filter 58 that allows a signal of a frequency band corresponding to Band 34 to pass therethrough and a filter 59 that allows a signal of a frequency band corresponding to Band 39 to pass therethrough. The filter 58 and the filter 59 are disposed so as to be aligned in the second direction.

At this time, the filter 56 and the filter 58, which is not used together with the filter 56 in simultaneous communication, are disposed so as to be aligned in the first direction D1. In addition, the filter 57 and the filter 59, which is not used together with the filter 57 in simultaneous communication, are disposed so as to be aligned in the first direction D1.

The filter unit 55a is connected to a mounting substrate 61 via a plurality of first connection terminals (bumps). The filter unit 55b is connected to the filter unit 55a via a plurality of second connection terminals (bumps) and is connected to the mounting substrate 61 via the filter unit 55a.

The filters 56 to 59 are not used together during simultaneous communication. Therefore, the plurality of first connection terminals includes a terminal 11n that is for inputting a signal to the filter 58, a terminal 11o that is for inputting a signal to the filter 56, a terminal 11p that is for inputting a signal to the filter 59, and a terminal 11q that is for inputting a signal to the filter 57 (refer to FIG. 6B).

The plurality of first connection terminals includes a ninth output terminal that is for outputting a signal that has passed through the filter 56 and a tenth output terminal that is for outputting a signal that has passed through the filter 58. In addition, the plurality of first connection terminals includes an eleventh output terminal that is for outputting a signal that has passed through the filter 57 and a twelfth output terminal that is for outputting a signal that has passed through the filter 59. In this case as well, the path between the ninth output terminal and the output terminal of the filter 56 can be short. The path between the tenth output terminal and the output terminal of the filter 58 can be short. The path between the eleventh output terminal and the output terminal of the filter 57 can be short. The path between the twelfth output terminal and the output terminal of the filter 59 can be short.

Accordingly, among the plurality of first connection terminals, a terminal 11r is used as the tenth output terminal and is connected to the output terminal of the filter 58 and a terminal 11s is used as the ninth output terminal and is connected to the output terminal of the filter 56. In addition, among the plurality of first connection terminals, a terminal 11t is used as the twelfth output terminal and is connected to the output terminal of the filter 59 and a terminal 11u is used as the eleventh output terminal and is connected to the output terminal of the filter 57.

Figure 6B:
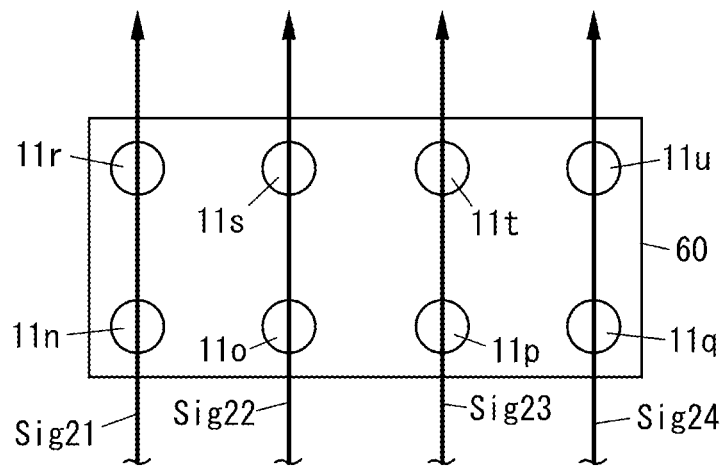
FIG. 6B is a diagram for describing the flow of signals in the two filter units in Modification 3.

As illustrated in FIG. 6B, a signal Sig21 input to the terminal 11n is output from the terminal 11r. A signal Sig22 input to the terminal 11o is output from the terminal 11s. A signal Sig23 input to the terminal 11p is output from the terminal 11t. A signal Sig24 input to the terminal 11q is output from the terminal 11u.

At this time, the signal Sig21 output from the terminal 11r is a signal of a frequency band corresponding to Band 34. The signal Sig22 output from the terminal 11s is a signal of a frequency band corresponding to Band 3. The signal Sig23 output from the terminal 11t is a signal of a frequency band corresponding to Band 39. The signal Sig24 output from the terminal 11u is a signal of a frequency band corresponding to Band 25.

In this case, the filters 56 to 59 are not simultaneously used together in carrier aggregation. In a case where carrier aggregation is performed using any of the filters among the filters 56 to 59, another filter that is used at the same time is disposed at a position that is different from the positions at which the filter units 55a and 55b are disposed. Therefore, when carrier aggregation is performed using any of the filters among the filters 56 to 59, the path of a signal received by the communication device 200 is longer than in the case of the embodiment. However, since the distance between terminals that output signals that have passed through the filters is long, degradation of isolation can be prevented.

(4.4) Modification 4

In Modification 3, each of the filter unit 2a (55a) and the filter unit 2b (55b) includes two filters, but the present disclosure is not limited to this configuration.

The filter unit 2a may include two filters and the filter unit 2b may include one filter.

For example, the filter unit 2a may include a filter that allows a signal of a frequency band corresponding to Band 34 to pass therethrough and a filter that allows a signal of a frequency band corresponding to Band 39 to pass therethrough, and the filter unit 2b may include a filter that allows a signal of a frequency band corresponding to Band 25 to pass therethrough.

Alternatively, the filter unit 2a may include a filter that allows a signal of a frequency band corresponding to Band 34 to pass therethrough and a filter that allows a signal of a frequency band corresponding to Band 39 to pass therethrough, and the filter unit 2b may include a filter that allows a signal of a frequency band corresponding to Band 3 to pass therethrough.

Alternatively, the filter unit 2a may include a filter that allows a signal of a frequency band corresponding to Band 34 to pass therethrough and a filter that allows a signal of a frequency band corresponding to Band 39 to pass therethrough, and the filter unit 2b may include a filter that allows a signal of a frequency band corresponding to Band 66 to pass therethrough.

Alternatively, the filter unit 2a may include a filter that allows a signal of a frequency band corresponding to Band 34 to pass therethrough and a filter that allows a signal of a frequency band corresponding to Band 39 to pass therethrough, and the filter unit 2b may include a filter that allows a signal of a frequency band corresponding to Band 1 to pass therethrough.

Alternatively, the filter unit 2a may include a filter that allows a signal of a frequency band corresponding to Band 3 to pass therethrough and a filter that allows a signal of a frequency band corresponding to Band 25 to pass therethrough, and the filter unit 2b may include a filter that allows a signal of a frequency band corresponding to Band 34 to pass therethrough.

Alternatively, the filter unit 2a may include a filter that allows a signal of a frequency band corresponding to Band 3 to pass therethrough and a filter that allows a signal of a frequency band corresponding to Band 25 to pass therethrough, and the filter unit 2b may include a filter that allows a signal of a frequency band corresponding to Band 39 to pass therethrough.

Alternatively, the filter unit 2a may include a filter that allows a signal of a frequency band corresponding to Band 1 to pass therethrough and a filter that allows a signal of a frequency band corresponding to Band 66 to pass therethrough, and the filter unit 2b may include a filter that allows a signal of a frequency band corresponding to Band 39 to pass therethrough.

Alternatively, the filter unit 2a may include a filter that allows a signal of a frequency band corresponding to Band 1 to pass therethrough and a filter that allows a signal of a frequency band corresponding to Band 66 to pass therethrough, and the filter unit 2b may include a filter that allows a signal of a frequency band corresponding to Band 34 to pass therethrough.

(4.5) Modification 5

In Modification 3, the filter unit 2a may include three filters and the filter unit 2b may include one filter.

For example, the filter unit 2a may include a filter that allows a signal of a frequency band corresponding to Band 30 to pass therethrough, a filter that allows a signal of a frequency band corresponding to Band 7 to pass therethrough, and a filter that allows a signal of a frequency band corresponding to Band 40 to pass therethrough, and the filter unit 2b may include a filter that allows a signal of a frequency band corresponding to Band 39 to pass therethrough.

Alternatively, the filter unit 2a may include a filter that allows a signal of a frequency band corresponding to Band 30 to pass therethrough, a filter that allows a signal of a frequency band corresponding to Band 7 to pass therethrough, and a filter that allows a signal of a frequency band corresponding to Band 40 to pass therethrough, and the filter unit 2b may include a filter that allows a signal of a frequency band corresponding to Band 34 to pass therethrough.

(4.6) Modification 6

In Modification 3, the filter unit 2a may include three filters and the filter unit 2b may include two filters.

For example, the filter unit 2a may include a filter that allows a signal of a frequency band corresponding to Band 30 to pass therethrough, a filter that allows a signal of a frequency band corresponding to Band 7 to pass therethrough, and a filter that allows a signal of a frequency band corresponding to Band 40 to pass therethrough, and the filter unit 2b may include a filter that allows a signal of a frequency band corresponding to Band 34 to pass therethrough and a filter that allows a signal of a frequency band corresponding to Band 39 to pass therethrough.

(4.7) Modification 7

In the above embodiment, the first switch unit 111, which is an antenna switch, and the amplification unit 116 are included in the switch IC 110, but the present disclosure is not limited to this configuration.

The first switch unit 111 and the amplification unit 116 do not have to be formed in the switch IC 110.

(4.8) Modification 8

In the above embodiment, the filter 24 and the filter 23 are disposed so as to be aligned in the second direction D2 and the filter 21 and the filter 22 are disposed so as to be aligned in the second direction D2, and the filter 21 and the filter 23 are disposed so as to be aligned in the first direction D1 and the filter 22 and the filter 24 are disposed so as to be aligned in the first direction D1. However, the present disclosure is not limited to this configuration. For example, the filter 22 and the filter 24 do not have to be disposed at overlapping positions when the mounting substrate 3 is viewed in plan view.

The filter 24 and the filter 23 can be disposed so as to be aligned in the second direction D2 and the filter 21 and the filter 22 be disposed so as to be aligned in the second direction D2, and that at least the filter 21 and the filter 23 be disposed so as to be aligned in the first direction D1.

(4.9) Modification 9

In the radio-frequency module 1 of the above embodiment, as illustrated in FIG. 1, the second resin layer 5 is provided on the second main surface 32 side of the mounting substrate 3 so as to cover the switch IC 110 mounted on the second main surface 32. In addition, the radio-frequency module 1 of the embodiment includes the plurality of external connection electrodes 6 formed in a cylindrical shape and is connected to a mother substrate using the plurality of external connection electrodes 6. However the configuration of the radio-frequency module 1 is not limited to this configuration.

Figure 7:
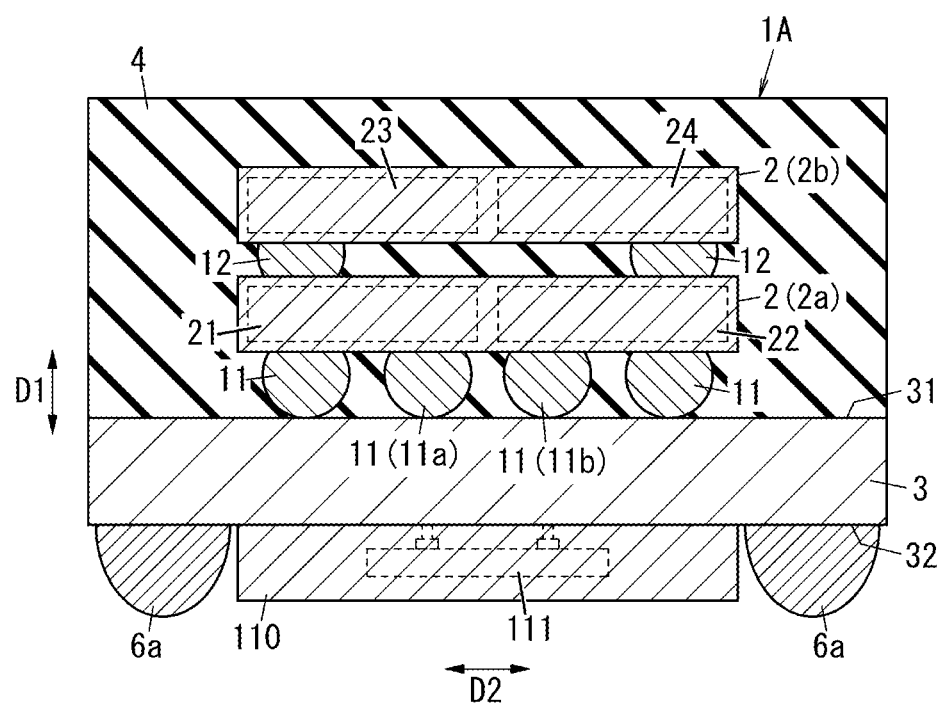
FIG. 7 is a sectional view schematically illustrating a radio-frequency module according to Modification 9 of the embodiment.

As a radio-frequency module 1A of a modification of the above embodiment, as illustrated in FIG. 7, the second resin layer on the second main surface 32 side of the mounting substrate 3 may be omitted and the radio-frequency module 1A may be connected to a mother substrate using a plurality of external connection electrodes 6a formed in a spherical shape.

Each of the plurality of external connection electrodes 6a is, for example, a ball bump formed in a spherical shape. The material of the ball bumps is, for example, gold, copper, solder, or the like.

(5) Application Example

The radio-frequency module 1 of this embodiment can be applied as a front-end module 100 illustrated in FIG. 8.

The front-end module 100, which is the radio-frequency module 1, is included in the communication device 200. As illustrated in FIG. 8, the communication device 200 includes the front-end module 100, the antenna 201, and a signal processing circuit 202. The communication device 200 transmits and receives signals via the antenna 201. Note that circuits involved in transmission are omitted from FIG. 8.

First, the circuit configuration of the front-end module 100 will be described.

The front-end module 100 is, for example, disposed in a front-end section of a mobile phone that supports multiple modes/multiple bands. The front-end module 100 is, for example, built into a mobile phone that supports multiple bands compatible with a communication standard such as LTE. The front-end module 100 has a plurality of paths (signal paths) along which a plurality of radio-frequency signals of different frequency bands are transmitted.

As illustrated in FIG. 8, the front-end module 100 includes the first switch unit 111, the first matching network unit 112, the filter group 113, the third switch unit 114, the second matching network unit 115, the amplification unit 116, and the second switch unit 117. The first switch unit 111, the second switch unit 117, the third switch unit 114, and the amplification unit 116 are included in the switch IC 110 (refer to FIG. 9). In other words, the switch IC 110 is formed by integrating the first switch unit 111, the second switch unit 117, the third switch unit 114, and the amplification unit 116 into a single chip.

The plurality of signal paths are paths along which signals flow passing through the switch IC 110, the filter group 113, the first matching network unit 112, and the second matching network unit 115. The signals flow in the order of the first switch unit 111, the third switch unit 114, the amplification unit 116, and the second switch unit 117. Specifically, the signals pass through in the order of the first switch unit 111, the first matching network unit 112, the filter group 113, the third switch unit 114, the second matching network unit 115, the amplification unit 116, and the second switch unit 117.

The first switch unit 111 is an antenna switch having an input terminal that is connected to the antenna 201, for example. Furthermore, an output terminal of the first switch unit 111 is connected to an input terminal of the filter group 113 The first switch unit 111 includes switches 111a to 111c that divide a signal received by the antenna 201 into signal paths for the filters 113a to 113g included in the filter group 113.

The first matching network unit 112 includes inductors 112a to 112g, for example. The inductors 112a to 112g are circuit elements for realizing impedance matching between the first switch unit 111 and the filter group 113. The inductors 112a to 112g have first ends connected to paths connected between the switches 111a to 111c of the first switch unit 111 and the filters 113a to 113g of the filter group 113, and second ends connected to a reference terminal (ground). In the first matching network unit 112, the inductors 112a to 112g may be serially connected to the paths rather than being connected between the paths and ground. In addition, the first matching network unit 112 is not limited to consisting of the inductors 112a to 112g and may consist of capacitors or may be a circuit in which inductors and capacitors are used in combination.

The filter group 113 includes the filters 113a to 113g, which are formed of surface acoustic wave resonators, bulk acoustic wave (BAW) resonators, or film bulk acoustic resonators (FBARs). Note that the filters 113a to 113g may instead be formed of LC resonance circuits and so forth. Here, the filters 113a to 113g are formed of surface acoustic wave resonators. Output terminals of the filter group 113 and input terminals of the third switch unit 114 are connected to each other.

The filter 113a is, for example, a triplexer in which three filters have a common input terminal. In addition, each of the filters 113d and 113g is a duplexer in which two filters have a common input terminal.

The third switch unit 114 includes switches 114a to 114d. The output terminals of the switches 114a to 114d are connected to input terminals of the second matching network unit 115. Specifically, the input terminals of the switches 114a to 114d are connected to the filter group 113 and the output terminals of the switches 114a to 114d are connected to inductors 115a to 115d of the second matching network unit 115. The switches 114a to 114d select signals that pass through the filters 113a to 113g and output the selected signals to the second matching network unit 115.

The second matching network unit 115 includes the inductors 115a to 115d, for example. The inductors 115a to 115d are circuit elements for realizing impedance matching between the third switch unit 114 and the amplification unit 116. The inductors 115a to 115d each have one end that is connected to the corresponding switch among the switches 114a to 114d and another end that is connected to the corresponding amplification circuit among amplification circuits 116a to 116d. In the second matching network unit 115, the inductors 115a to 115d are serially connected along paths connected between the third switch unit 114 and the amplification unit 116, but the inductors 115a to 115d may instead be connected between the paths and ground. In addition, the second matching network unit 115 is not limited to consisting of the inductors 115a to 115g and may consist of capacitors or may be a circuit in which inductors and capacitors are used in combination.

The amplification unit 116 includes the amplification circuits 116a to 116d. The amplification circuits 116a to 116d amplify signals that have passed through the first switch unit 111, the first matching network unit 112, the filter group 113, the third switch unit 114, and the second matching network unit 115. The amplification circuits 116a to 116d are, for example, low-noise amplifiers. The input terminals of the amplification circuits 116a to 116d are connected to the corresponding inductors among the inductors 115a to 115d. The output terminals of the amplification circuits 116a to 116d are connected to the second switch unit 117.

The second switch unit 117 is connected to an RF signal processing circuit 211 of the signal processing circuit 202. The second switch unit 117 includes switches 117a to 117g that distribute signals amplified by the amplification unit 116 to prescribed terminals of the RF signal processing circuit 211.

The connections of the switches 111a to 111c included in the first switch unit 111, the switches 117a to 117g included in the second switch unit 117, and the switches 114a to 114d included in the third switch unit 114 are switched via control performed by the RF signal processing circuit 211.

The switches 111a to 111c, the switches 114a to 114d, and the switches 117a to 117g are field effect transistor (FET) switches composed of GaAs or complementary metal oxide semiconductor (CMOS) or are diode switches, for example.

Figure 9:
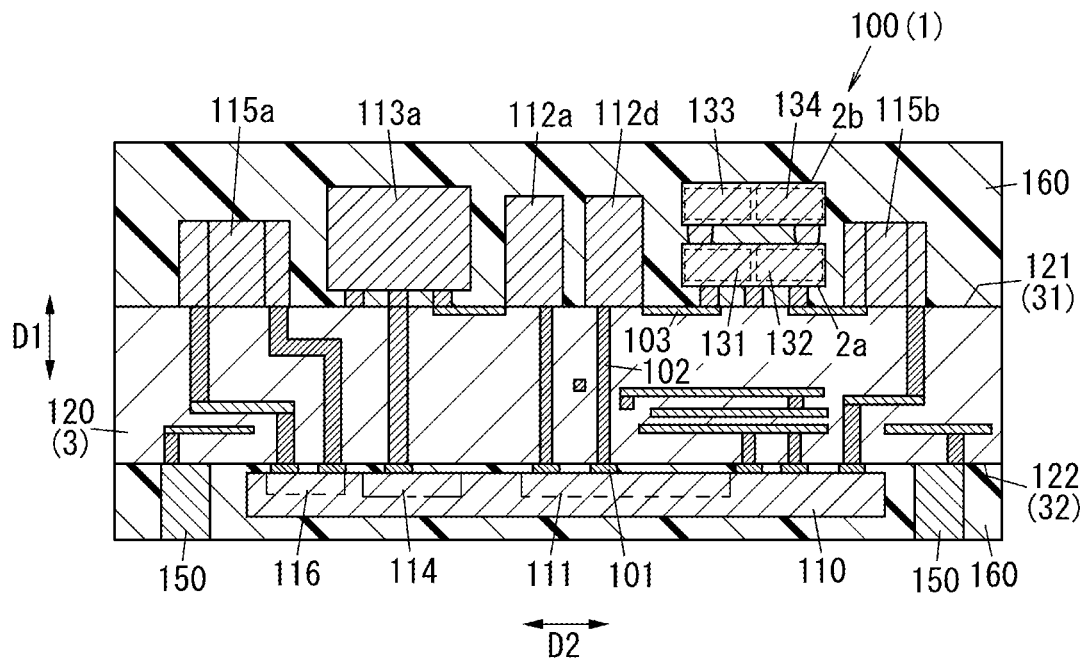
FIG. 9 is a sectional view for describing the front-end module of the application example.

FIG. 9 illustrates a sectional view of the front-end module 100, which is the radio-frequency module 1. The front-end module 100 includes a mounting substrate 120, which corresponds to the mounting substrate 3 described above. The mounting substrate 120 (3) has a first main surface 121 (31) and a second main surface 122 (32), which face each other in the first direction D1, which is a thickness direction of the mounting substrate 120. The first matching network unit 112, the filter group 113, and the second matching network unit 115 are provided on the first main surface 121. The switch IC 110 is provided on the second main surface 122. The first matching network unit 112, the filter group 113, and the second matching network unit 115 are sealed by resin 160 provided on the first main surface 121. On the second main surface 122, the switch IC 110 is sealed by resin 160 provided on the second main surface 122. The resin 160 provided on the first main surface 121 and the resin 160 provided on the second main surface 122 respectively correspond to the first resin layer 4 and the second resin layer 5 described above.

The front-end module 100 further includes a plurality of electrodes 150 (refer to FIG. 9). The plurality of electrodes 150 are provided on the second main surface 122.

The plurality of electrodes 150 are disposed around the switch IC 110 on the second main surface 122. The first switch unit 111 of the switch IC 110 receives radio-frequency signals via the electrodes 150. The plurality of electrodes 150 may be copper pillars (copper pins), electrodes formed of plating or copper paste, or may be formed of solder. The plurality of electrodes 150 correspond to the plurality of external connection electrodes 6 described above.

In the front-end module 100, the filter 113d, which is a duplexer, is formed of a filter 131 and a filter 132. The filter 113g, which is a duplexer, is formed of a filter 133 and a filter 134. In addition, the filter unit 2a described above is formed of the filters 131 and 133 and the filter unit 2b described above is formed of the filters 132 and 134.

For example, the filter 131 corresponds to the filter 21 described above and the filter 132 corresponds to the filter 24 described above. For example, the filter 133 corresponds to the filter 22 described above and the filter 134 corresponds to the filter 23 described above.

In the front-end module 100 as well, the first switch unit 111 overlaps at least part of the filter units 2a and 2b when the mounting substrate 120 is viewed in the first direction D1, i.e., when the mounting substrate 120 is viewed in plan view. In addition, when the mounting substrate 120 is viewed in plan view, the first switch unit 111 overlaps at least part of the first matching network unit 112. In FIG. 9, when the mounting substrate 120 is viewed in plan view, the first switch unit 111 overlaps at least part of the inductor 112a and at least part of the inductor 112d. This allows the paths between the first switch unit 111 and the first matching network unit 112 and the filter units 2a and 2b to be shortened.

In the front-end module 100, the filter units 2a and 2b and the corresponding inductors 112d and 112g are disposed adjacent to each other in the second direction D2 (refer to FIG. 9). Here, "adjacent" means that there are no other elements interposed between a filter unit and a matching network.

For example, an output terminal 101 of the first switch unit 111 is connected to the inductor 112d through a via 102. The inductor 112d is connected to the filter units 2a and 2b via a conductor 103. In more detail, the inductor 112d is connected to the filter 131 of the filter unit 2a and the filter 132 of the filter unit 2b via the conductor 103. With this configuration, the first switch unit 111 is connected to the filters 131 and 132 through the via 102 and the inductor 112d (refer to FIG. 9). The first switch unit 111 is connected to other filters included in the filter group 113 other than the filters 131 and 132 through corresponding vias and inductors.

The signal processing circuit 202 includes, for example, the RF signal processing circuit 211 and the baseband signal processing circuit 212. The RF signal processing circuit 211 is, for example, a radio-frequency integrated circuit (RFIC) and performs signal processing on radio-frequency signals that pass through the radio-frequency module 1. The baseband signal processing circuit 212 is, for example, a baseband integrated circuit (BBIC) and performs prescribed signal processing. A reception signal generated through processing performed by the baseband signal processing circuit 212 is used for image display as an image signal or for a phone call as an audio signal, for example. The front-end module 100 transmits radio-frequency signals (here, reception signals) between the antenna 201 and the RF signal processing circuit 211 of the signal processing circuit 202. The baseband signal processing circuit 212 is an optional constituent element of the communication device 200.

As described above, the radio-frequency module 1 of the embodiment can be applied as the front-end module 100. Isolation can be prevented from being degraded in the communication device 200 that includes the front-end module 100, which is the radio-frequency module 1.

A front-end module 100 for a reception system that receives a signal from the antenna 201 and outputs the received signal to the RF signal processing circuit 211 has been exemplified here, but a front-end module according to the present disclosure can also be applied to a front-end module for a transmission system that is input with a radio-frequency transmission signal output from the RF signal processing circuit 211 and outputs the transmission signal to the antenna and so forth. In this case, the amplification circuits 116a to 116d may, for example, be power amplifiers that amplify a transmission signal rather than low-noise amplifiers. Furthermore, a transmission signal flows in the order of the second switch unit 117, the amplification unit 116, the second matching network unit 115, the third switch unit 114, the filter group 113, the first matching network unit 112, and the first switch unit 111.

Figure 10:
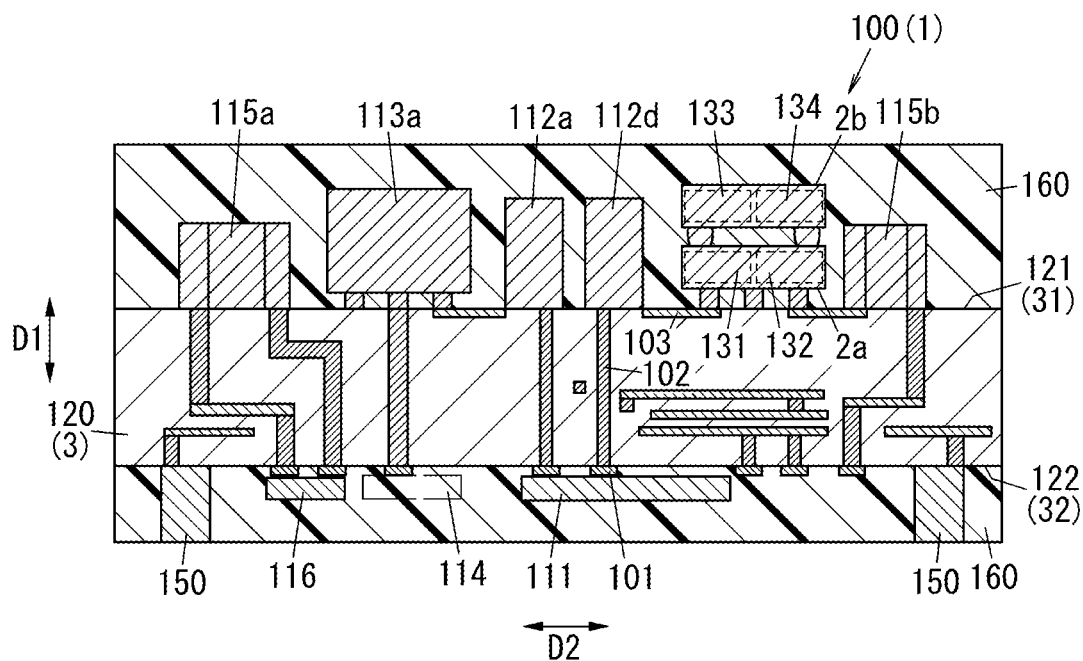
FIG. 10 is a sectional view for a case in which a switch IC is not provided in the front-end module of the application example.

Note that the first switch unit 111, the second switch unit 117, the third switch unit 114, and the amplification unit 116 do not have to be formed in a single chip. The first switch unit 111, the second switch unit 117, the third switch unit 114, and the amplification unit 116 may be individually disposed on the second main surface 122. At this time, as illustrated in FIG. 10, the first switch unit 111 overlaps at least part of the filter units 2a and 2b when the mounting substrate 120 is viewed in the first direction D1, i.e., when the mounting substrate 120 is viewed in plan view.

(Summary)

As described above, a radio-frequency module (1) of a First Aspect is able to simultaneously communicate a signal of a first communication band and a signal of a second communication band that is at a different frequency from the first communication band, and does not simultaneously communicate a signal of the first communication band and a signal of a third communication band that is at a different frequency from at least the second communication band among the first communication band and the second communication band. The radio-frequency module (1) includes a mounting substrate (3), a first filter (for example, the filter 21), a second filter (for example, the filter 24), and a third filter (for example, the filter 23). The first filter is provided on the mounting substrate (3) and has the first communication band as the pass band thereof. The second filter is provided on the mounting substrate (3) and has the second communication band as the pass band thereof. The third filter is provided on the mounting substrate (3) and has the third communication band as the pass band thereof. The first filter and the third filter are stacked on top of each other and the first filter and the second filter are not stacked on top of each other.

In this configuration, the first filter and the third filter, which is not used together with the first filter when performing simultaneous communication, are stacked on top of each other. In other words, the first filter and the second filter are not stacked on top of each other. Therefore, degradation of isolation can be prevented compared with the case where the first filter and the second filter are stacked on top of each other. Furthermore, a reduction in size can be achieved by stacking the first filter and the third filter on top of each other.

A radio-frequency module (1) of a Second Aspect is able to simultaneously communicate a signal of a first communication band and a signal of a second communication band that is at a different frequency from the first communication band, and does not simultaneously communicate a signal of the first communication band and a signal of a third communication band that is at a different frequency from at least the second communication band among the first communication band and the second communication band. The radio-frequency module (1) includes a mounting substrate (3), a first filter (for example, the filter 21), a second filter (for example, the filter 24), and a third filter (for example, the filter 23). The first filter is provided on the mounting substrate (3) and has the first communication band as the pass band thereof. The second filter is provided on the mounting substrate (3) and has the second communication band as the pass band thereof. The third filter is provided on the mounting substrate (3) and has the third communication band as the pass band thereof. The first filter and the second filter are stacked on top of each other. The third filter is stacked between the first filter and the second filter.

In this configuration, the third filter, which is not used with the first filter when performing simultaneous communication, is stacked between the first filter and the second filter, which is used together with the first filter when performing simultaneous communication. Therefore, degradation of isolation can be prevented compared with the case where the first filter and the second filter are directly stacked on top of each other. Furthermore, a reduction in size can be achieved by stacking the first filter, the second filter, and the third filter on top of each other.

In a radio-frequency module (1) of a Third Aspect based on the First Aspect, the second filter does not overlap a stack consisting of the first filter and the third filter when the mounting substrate (3) is viewed in plan view.

With this configuration, degradation of isolation during carrier aggregation can be prevented. In addition, the mounting area of the mounting substrate (3) can be reduced as a result of the second filter being stacked so that the third filter is disposed between the second filter and the first filter, and therefore the size of the radio-frequency module (1) can be reduced.

In a radio-frequency module (1) of a Fourth Aspect based on the First or Third Aspect, the first filter and the third filter are directly or indirectly stacked on top of each other in order of the first filter and the third filter with respect to the mounting substrate (3). The second filter is disposed so as to be aligned with the third filter in a direction that is perpendicular to a thickness direction of the mounting substrate (3).

With this configuration, the second filter is disposed in a diagonal direction with respect to the first filter. Therefore, the distance between an output terminal from which a signal that has passed through the first filter is output and an output terminal from which a signal that has passed through the second filter is output can be increased compared with the case where the first filter and the second filter are stacked on top of each other. As a result, degradation of isolation can be prevented compared with the case where the first filter and the second filter are stacked on top of each other.

A radio-frequency module (1) of a Fifth Aspect based on the Fourth Aspect further includes a fourth filter (for example, the filter 22) that is provided on the mounting substrate (3) and has a pass band that corresponds to a signal of a fourth communication band that can be used in simultaneous communication with a signal of the third communication band. The fourth filter is disposed relative to the first filter so as to be aligned with the first filter in a direction that is perpendicular to the thickness direction.

With this configuration, the fourth filter is disposed in a diagonal direction with respect to the third filter. Therefore, degradation of isolation can be prevented compared with the case where the third filter and the fourth filter are stacked on top of each other.

In a radio-frequency module (1) of a Sixth Aspect based on the Fifth Aspect, the second filter and the fourth filter are directly or indirectly stacked on top of each other.

With this configuration, the length of the mounting substrate in the direction in which the first filter and the fourth filter and the second filter and the third filter are aligned can be reduced. As a result, the radio-frequency module (1) can be reduced in size while preventing degradation of isolation.

In a radio-frequency module (1) of Seventh Aspect based on any one of the First to Sixth Aspects, the combination of the first communication band and the third communication band is any pair out of Band 1 and Band 34, Band 1 and Band 39, Band 3 and Band 30, Band 3 and Band 34, Band 3 and Band 39, Band 7 and Band 34, Band 7 and Band 39, Band 25 and Band 34, Band 25 and Band 39, Band 25 and Band 40, Band 30 and Band 34, Band 30 and Band 39, Band 34 and Band 40, Band 34 and Band 66, Band 39 and Band 66, Band 39 and Band 40, or any of pair of identical bands.

With this configuration, the combination of the first filter and the third filter can be determined from combinations of a plurality of band that are not used simultaneously during simultaneous communication.

A radio-frequency module (1) of an Eighth Aspect based on any one of the First to Seventh Aspects further includes an antenna switch (first switch unit 111). The mounting substrate (3) has a first main surface (31) and a second main surface (32), which face each other. The first filter and the third filter is provided on the first main surface (31) of the mounting substrate (3). The antenna switch is provided on the second main surface (32) of the mounting substrate (3). When the mounting substrate (3) is viewed in plan view, the antenna switch overlaps at least part of the first filter and the third filter.

With this configuration, a path between the antenna switch and the first filter and the third filter can be made shorter.

A communication device (200) of a Ninth Aspect includes a radio-frequency module (1) of any one of the First to Eighth Aspects and a signal processing circuit (202) that performs signal processing on a signal that passes through the radio-frequency module (1).

With this configuration, degradation of isolation can be prevented compared with a case where the first filter and the second filter are stacked on top of each other. Furthermore, a reduction in size can be achieved by stacking the first filter and the third filter on top of each other.

REFERENCE SIGNS LIST

1 radio-frequency module
3, 120 mounting substrate
21 filter (first filter)
22 filter (fourth filter)
23 filter (third filter)
24 filter (second filter)
25 to 27, 131 to 134 filter
31, 121 first main surface
32, 122 second main surface
100 front-end module
110 switch IC
111 first switch unit (antenna switch)
117 second switch unit
114 third switch unit
200 communication device
202 signal processing circuit

The invention claimed is:

1. A radio-frequency module that is configured to simultaneously communicate a signal of a first communication band and a signal of a second communication band, the second communication band being at a different frequency than the first communication band, and is configured to not simultaneously communicate the signal of the first communication band and a signal of a third communication band, the third communication band being at a different frequency than at least the second communication band, the radio-frequency module comprising:
 a mounting substrate;
 a first filter that is on the mounting substrate and that is configured to pass the first communication band;
 a second filter that is on the mounting substrate and that is configured to pass the second communication band; and
 a third filter that is on the mounting substrate and that is configured to pass the third communication band,
 wherein the first filter and the third filter are stacked on top of each other, and
 the first filter and the second filter are not stacked on top of each other.

2. The radio-frequency module according to claim 1, as seen in a plan view of the mounting substrate, the second filter does not overlap the stack of the first filter and the third filter.

3. The radio-frequency module according to claim 1,
 wherein the first filter and the third filter are stacked such that the first filter is between the mounting substrate and the third filter, and
 the second filter is adjacent to the third filter in a direction that is perpendicular to a stacking direction of the first and third filters.

4. The radio-frequency module according to claim 3, further comprising:
 a fourth filter that is on the mounting substrate and that is configured to pass a fourth communication band, the radio frequency module being configured to simultaneously communicate a signal of the fourth communication band and the signal of the third communication band,
 wherein as seen in the plan view, the fourth filter is adjacent to the first filter in the direction that is perpendicular to the stacking direction first and third filters.

5. The radio-frequency module according to claim 4, wherein the second filter and the fourth filter are stacked on top of each other.

6. The radio-frequency module according to claim 1, wherein a combination of the first communication band and the third communication band is selected from the group consisting of: Band 1 and Band 34, Band 1 and Band 39, Band 3 and Band 30, Band 3 and Band 34, Band 3 and Band 39, Band 7 and Band 34, Band 7 and Band 39, Band 25 and Band 34, Band 25 and Band 39, Band 25 and Band 40, Band 30 and Band 34, Band 30 and Band 39, Band 34 and Band 40, Band 34 and Band 66, Band 39 and Band 66, Band 39 and Band 40, and any of pair of identical bands.

7. The radio-frequency module according to claim 1, further comprising:
 an antenna switch,
 wherein the mounting substrate has a first main surface and a second main surface that face each other,
 wherein the first filter and the third filter are on the first main surface of the mounting substrate, and the antenna switch is on the second main surface of the mounting substrate, and
 wherein, as seen in a plan view of the mounting substrate, the antenna switch overlaps at least part of the first filter and at least part of the third filter.

8. A communication device comprising:
 the radio-frequency module according to claim 1; and
 a signal processing circuit configured to perform signal processing on a signal that passes through the radio-frequency module.

9. A radio-frequency module that is configured to simultaneously communicate a signal of a first communication band and a signal of a second communication band, the second communication band being at a different frequency than the first communication band, and that is configured to not simultaneously communicate the signal of the first communication band and a signal of a third communication band, the third communication band being at a different frequency than at least the second communication band, the radio-frequency module comprising:
 a mounting substrate;
 a first filter that is on the mounting substrate and that is configured to pass the first communication band;
 a second filter that is on the mounting substrate and that is configured to pass the second communication band; and
 a third filter that is on the mounting substrate and that is configured to pass the third communication band,
 wherein the first filter and the second filter are stacked on top of each other, and
 the third filter is stacked between the first filter and the second filter.

10. The radio-frequency module according to claim 9, wherein a combination of the first communication band and the third communication band is selected from the group consisting of: Band 1 and Band 34, Band 1 and Band 39, Band 3 and Band 30, Band 3 and Band 34, Band 3 and Band 39, Band 7 and Band 34, Band 7 and Band 39, Band 25 and Band 34, Band 25 and Band 39, Band 25 and Band 40, Band 30 and Band 34, Band 30 and Band 39, Band 34 and Band 40, Band 34 and Band 66, Band 39 and Band 66, Band 39 and Band 40, and any of pair of identical bands.

11. The radio-frequency module according to claim 9, further comprising:
 an antenna switch,
 wherein the mounting substrate has a first main surface and a second main surface that face each other,
 wherein the first filter and the third filter are on the first main surface of the mounting substrate, and the antenna switch is on the second main surface of the mounting substrate, and
 wherein, as seen in a plan view of the mounting substrate, the antenna switch overlaps at least part of the first filter and at least part of the third filter.

12. A communication device comprising:
 the radio-frequency module according to claim 9; and
 a signal processing circuit configured to perform signal processing on a signal that passes through the radio-frequency module.

* * * * *

UNITED STATES PATENT AND TRADEMARK OFFICE
CERTIFICATE OF CORRECTION

PATENT NO. : 11,637,576 B2  
APPLICATION NO. : 17/473105  
DATED : April 25, 2023  
INVENTOR(S) : Rui Tanaka It is certified that error appears in the above-identified patent and that said Letters Patent is hereby corrected as shown below:

In the Specification

Column 11, Line 12, "ill" should be -- 111 --.

Signed and Sealed this  
Second Day of January, 2024

Katherine Kelly Vidal  
*Director of the United States Patent and Trademark Office*